(12) United States Patent
Qu et al.

(10) Patent No.: US 12,532,262 B2
(45) Date of Patent: Jan. 20, 2026

(54) METHOD FOR BEACON FRAME RECEPTION, BEACON FRAME RECEIVING DEVICE, AND STORAGE MEDIUM

(71) Applicants: Beijing ESWIN Computing Technology Co., Ltd., Beijing (CN); Guangzhou Transa Semi Information Technology Co., Ltd., Guangzhou (CN)

(72) Inventors: Xin Qu, Beijing (CN); Tao Ma, Beijing (CN); Xinghua Li, Beijing (CN)

(73) Assignees: Beijing ESWIN Computing Technology Co., Ltd., Beijing (CN); Guangzhou Transa Semi Information Technology Co., Ltd., Guangzhou (CN)

( * ) Notice: Subject to any disclaimer, the term of this patent is extended or adjusted under 35 U.S.C. 154(b) by 317 days.

(21) Appl. No.: 18/108,425

(22) Filed: Feb. 10, 2023

(65) Prior Publication Data
US 2024/0107457 A1    Mar. 28, 2024

(30) Foreign Application Priority Data
Sep. 23, 2022    (CN) .......................... 202211166682.4

(51) Int. Cl.
*H04W 52/02* (2009.01)
(52) U.S. Cl.
CPC ... *H04W 52/0238* (2013.01); *H04W 52/0216* (2013.01)
(58) Field of Classification Search
CPC ......... H04W 52/0238; H04W 52/0216; H04W 52/0229; H04W 52/0241; Y02D 30/70
See application file for complete search history.

(56) References Cited

U.S. PATENT DOCUMENTS

| | | | | |
|---|---|---|---|---|
| 6,038,436 | A | * | 3/2000 | Priest ................ H04W 52/0238 455/515 |
| 7,920,535 | B2 | * | 4/2011 | Zaks ................. H04W 52/0229 370/318 |

(Continued)

FOREIGN PATENT DOCUMENTS

| CN | 113286330 A | 8/2021 |
|---|---|---|
| CN | 113423133 A | 9/2021 |

(Continued)

OTHER PUBLICATIONS

First Search Report for Chinese Patent Application No. 2022111666824, Apr. 27, 2025, 2 pages. [Not in English].

*Primary Examiner* — Robert C Scheibel
(74) *Attorney, Agent, or Firm* — Womble Bond Dickinson (US) LLP

(57) ABSTRACT

The present application provides a method and an apparatus for information reception, a receiving device, a storage medium and a program product. The method includes: obtaining a receiving-length; receiving a beacon frame sent by a sending device based on the receiving-length to obtain target information, where the receiving-length is less than the total length of the beacon frame; performing packet analysis on the target information to obtain a first analysis result; and controlling, in case of determining that the first analysis result indicates that no downlink data from a sending device is to be sent to the receiving device, the receiving device to enter a sleep state. The method and apparatus for receiving information, device, storage medium and program product provided by the present application are used to reduce power consumption in receiving the beacon frame.

13 Claims, 2 Drawing Sheets

(56) References Cited

U.S. PATENT DOCUMENTS

| | | | | |
|---|---|---|---|---|
| 8,879,452 | B2* | 11/2014 | Liu | H04W 48/12 |
| | | | | 370/328 |
| 9,781,673 | B2* | 10/2017 | Homchaudhuri | ............................ |
| | | | | H04W 52/0235 |
| 12,395,936 | B2 | 8/2025 | Li | |
| 2009/0010191 | A1* | 1/2009 | Wentink | H04W 52/0216 |
| | | | | 370/311 |
| 2010/0110962 | A1* | 5/2010 | Igarashi | H04W 72/30 |
| | | | | 370/312 |
| 2010/0315983 | A1* | 12/2010 | Choi | H04W 52/0251 |
| | | | | 370/311 |
| 2018/0199285 | A1* | 7/2018 | Liao | H04W 52/0216 |
| 2023/0007588 | A1* | 1/2023 | Li | H04W 56/0015 |

FOREIGN PATENT DOCUMENTS

| | | |
|---|---|---|
| CN | 114650624 A | 6/2022 |
| CN | 114793373 A | 7/2022 |

\* cited by examiner

METHOD FOR BEACON FRAME RECEPTION, BEACON FRAME RECEIVING DEVICE, AND STORAGE MEDIUM

CROSS-REFERENCE TO RELATED APPLICATION

The present application claims priority to Chinese Patent Application No. 2022111666824 filed, Sep. 23, 2022, which is hereby incorporated by reference in its entirety.

FIELD

The present application relates to the field of communication, and in particular to a method and an apparatus for information reception, a receiving device, a storage medium and a program product.

BACKGROUND

At present, after a station (STA) of a mobile hotspot (Wi-Fi) is associated with the wireless access point (AP), the STA needs to periodically receive a beacon frame sent by the AP to maintain a connection with the AP and receive a downlink data packet sent by the AP in time.

In the related art, when the STA has not received a downlink data packet for a long time, main power consumption of the STA is the power consumption to receive the beacon frame. Generally, the STA needs to receive a complete beacon frame, which results in high power consumption in receiving the beacon frame for the STA.

SUMMARY

The present application provides a method and an apparatus for receiving information, a receiving device, a storage medium and a program product, which can solve the defect of high power consumption in receiving the beacon frame in the related art, and reduce power consumption in receiving the beacon frame.

The application provides a method for receiving information, performed by a receiving device, including:
obtaining a receiving-length;
receiving a beacon frame sent by a sending device based on the receiving-length to obtain target information, where the receiving-length is less than the total length of the beacon frame;
performing packet analysis on the target information to obtain a first analysis result; and
controlling, in case of determining that the first analysis result indicates that no downlink data from a sending device is to be sent to the receiving device, the receiving device to enter a sleep state.

According to the method for receiving information of the present application, the receiving a beacon frame sent by a sending device based on the receiving-length to obtain target information includes:
sending the receiving-length to a receiving and processing circuit for information frame to control the receiving and processing circuit to receive the beacon frame according to the receiving-length to obtain the target information.

According to the method for receiving information of the present application, the obtaining a receiving-length includes:
receiving a target beacon frame sent by the sending device;
analyzing the target beacon frame to obtain a second analysis result including a traffic indication message;
determining a byte index of the traffic indication message in the second analysis result; and
determining the byte index as the receiving-length.

According to the method for receiving information of the present application, the target information is stored in a target memory, and the performing packet analysis on the target information to obtain a first analysis result includes:
receiving an interrupt instruction sent by the receiving and processing circuit; and
obtaining the target information from the target memory based on the interrupt instruction, and performing packet analysis on the target information to obtain the first analysis result.

According to the method for receiving information of the present application, the determining of the first analysis result indicating that no downlink data from a sending device is to be sent to the receiving device includes:
determining whether the traffic indication message included in the first analysis result is a first preset value; and
determining, in case that the traffic indication message included in the first analysis result is the first preset value, that the first analysis result indicates that no downlink data from the sending device is to be sent to the receiving device.

According to the method for receiving information of the present application, the method further includes:
determining, in case that the traffic indication message included in the first analysis result is a second preset value, that the first analysis result indicates that downlink data is to be sent from a sending device, and receiving the downlink data after remaining information in the beacon frame except the target information is received, where the first preset value is different from the second preset value.

The present application further provides an apparatus for receiving information, including:
an obtaining module, used to obtain a receiving-length;
a receiving module, used to receive a beacon frame sent by a sending device based on the receiving-length to obtain target information, where the receiving-length is less than the total length of the beacon frame; and
a controlling module, used to perform packet analysis on the target information to obtain a first analysis result, and further used to control, in case of determining that the first analysis result indicates that no downlink data from a sending device is to be sent to the receiving device, the receiving device to enter a sleep state.

According to the apparatus for receiving information of the present application, the receiving module is used to:
send the receiving-length to a receiving and processing circuit for information frame to control the receiving and processing circuit to receive the beacon frame according to the receiving-length to obtain the target information.

According to the apparatus for receiving information of the present application, the obtaining module is further used to:
receive a target beacon frame sent by the sending device;
analyze the target beacon frame to obtain a second analysis result, where the second analysis result includes traffic indication message;
determine a byte index of the traffic indication message in the second analysis result; and
determine the byte index as the receiving-length.

According to the apparatus for receiving information of the present application, the target information is stored in a target memory, and the controlling module is specifically used to:

receive an interrupt instruction sent by the receiving and processing circuit; and obtain the target information from the target memory based on the interrupt instruction, and perform packet analysis on the target information to obtain the first analysis result.

According to the apparatus for receiving information of the present application, the controlling module is used to:

determine whether the traffic indication message included in the first analysis result is a first preset value; and determine, in case that the traffic indication message included in the first analysis result is the first preset value, that the first analysis result indicates that no downlink data from the sending device is to be sent to the receiving device.

According to the apparatus for receiving information of the present application, the controlling module is further configured to determine, in case that the traffic indication message included in the first analysis result is a second preset value, that the first analysis result indicates that downlink data is to be sent from a sending device; and the receiving module is further configured to receive the downlink data after remaining information in the beacon frame except the target information is received, where the first preset value is different from the second preset value.

The present application further provides a receiving device, including a processor, and a memory having a computer program stored thereon executable by the processor, where the computer program, when executed by the processor, causes the processor to perform steps of any one of the above-mentioned method for receiving information.

The present application further provides a non-transitory computer-readable storage medium having a computer program stored thereon, where the computer program, when executed by a processor, causes the processor to perform steps of any one of the above-mentioned method for receiving information.

The present application further provides a computer program product, including a computer program, where the computer program, when executed by a processor, causes the processor to perform steps of any one of the above-mentioned method for receiving information.

The method and apparatus for receiving information, device, storage medium and program product provided by the present application, only part of the information (that is, the target information having a length equal to the receiving-length) in the beacon frame is received, and when the first analysis result obtained by performing packet analysis on the target information indicates that no downlink data from a sending device is to be sent to the receiving device, the receiving device is controlled to enter the sleep state without receiving the complete beacon frame, which reduces power consumption in receiving the beacon frame.

BRIEF DESCRIPTION OF DRAWINGS

In order to more clearly illustrate the solutions in the present application or the related art, the following will briefly introduce the accompanying drawings that need to be configured in the description of the embodiments or the related art. The accompanying drawings in the following description are some embodiments of the present application, those of ordinary skill in the art can also obtain other drawings based on these drawings without creative efforts.

DETAILED DESCRIPTION OF THE EMBODIMENTS

In order to illustrate the objects, solutions and advantages of the application, the solutions in present the application will be described clearly and completely below in conjunction with the drawings in the embodiments of the application. The described embodiments are part of the embodiments of the application, not all of them. Based on the embodiments of the application, all other embodiments obtained by those of ordinary skill in the art without creative work fall within the protection scope of the present application.

In related art, a STA needs to receive a complete beacon frame, and analyzes the beacon frame after receiving the complete beacon frame to determine whether to enter a sleep state or to receive downlink data. In the above-mentioned related art, the STA needs to receive a complete beacon frame, which results in relatively high power consumption in receiving the beacon frame of the STA.

In order to reduce power consumption in receiving the beacon frame, in the present application, a method for receiving information is provided. A receiving process of the method for receiving information according to the present application will be described as an example below with reference to FIG. 1.

Figure 1:
FIG. 1 is a diagram showing a process of receiving a beacon frame according to the present application.

FIG. 1 is a diagram showing a process of receiving a beacon frame according to the present application. As shown in FIG. 1, for example, a receiving device needs to receive the beacon frame at a third second and a ninth second.

At the third second, the receiving device only receives part of the information (that is, the target information having a length equal to the receiving-length) in the beacon frame, and in case that a first analysis result obtained by performing packet analysis on the target information indicates that no downlink data from a sending device is to be sent to the receiving device, the receiving device enters a sleep state until the beacon frame is received again in the ninth second. The process of receiving the beacon frame again at the ninth second is the same as the process of receiving the beacon frame at the third second, and will not be described here.

In the above process, the receiving device only receives part of the information in the beacon frame without receive the complete beacon frame, which reduces power consumption in receiving the beacon frame.

The method for receiving information according to the present application is described below in conjunction with specific embodiments.

Figure 2:
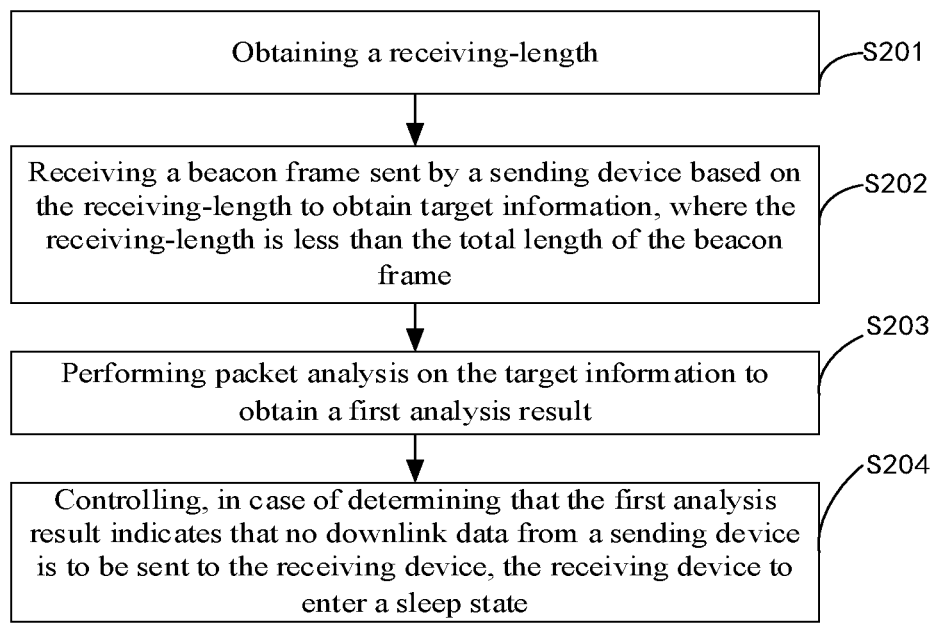
FIG. 2 is a flow chart of a method for receiving information according to the present application.

FIG. 2 is a flow chart of a method for receiving information according to the present application. As shown in FIG. 2, the method according to this embodiment includes the following steps.

S201: obtaining a receiving-length.

In an embodiment, the method for receiving information according to the present application is performed by a receiving device as well as an apparatus for receiving information installed on the receiving device. The apparatus for receiving information may be implemented by a combination of software and/or hardware.

The receiving-length is a length configured, by the packet process, to the receiving device, and may be a receiving-length sent by the sending device to the receiving device.

The receiving device may be a Wi-Fi STA, and the sending device may be an AP.

S202: receiving a beacon frame sent by a sending device based on the receiving-length to obtain target information, where the receiving-length is less than the total length of the beacon frame.

The target information may have a length equal to or greater than the receiving-length.

For example, when the receiving-length is M bytes and the beacon frame has a total length of N bytes, the target information is the first M bytes in the beacon frame.

In practical applications, the receiving-length and the total length of the beacon frame can be set according to requirements.

S203: performing packet analysis on the target information to obtain a first analysis result.

The first analysis result includes a traffic indication message.

The traffic indication message is a traffic indication map (TIM).

S204: controlling, in case of determining that the first analysis result indicates that no downlink data from a sending device is to be sent to the receiving device, the receiving device to enter a sleep state.

In the method for receiving information shown in FIG. 2, the receiving-length is less than the total length of the beacon frame, so that the target information is part of the information in the beacon frame, and in case that the first analysis result obtained after performing the packet analysis process on the target information indicates that no downlink data from a sending device is to be sent to the receiving device, the receiving device is controlled to enter the sleep state without receiving the complete beacon frame, which reduces the power consumption in receiving the beacon frame.

In case that the apparatus for receiving information is realized by a combination of software and hardware, the apparatus for receiving information includes an information frame processing software and a receiving and processing circuit for information frame.

In some embodiments, S201 may include: sending the receiving-length to a receiving and processing circuit for information frame to control the receiving and processing circuit to receive the beacon frame according to the receiving-length to obtain the target information.

In an embodiment, the information frame processing software sends the receiving-length to the receiving and processing circuit. The receiving and processing circuit receives the beacon frame according to the receiving-length to obtain target information.

In some embodiments, S202 may include: receiving a target beacon frame sent by the sending device; analyzing the target beacon frame to obtain a second analysis result, where the second analysis result includes traffic indication message; determining a byte index of the traffic indication message in the second analysis result; and determining the byte index as the receiving-length.

The determining a byte index of the traffic indication message in the second analysis result includes: dividing the second analysis result into multiple bytes; and configuring byte indexes for each byte;

For each byte, it is determined whether the byte contains the traffic indication message; when the byte contains the traffic indication message, the byte index of the byte is determined as the receiving-length.

In some embodiments, the target information is stored in the target memory, and S203 may include: receiving an interrupt instruction sent by the receiving and processing circuit; and obtaining the target information from the target memory based on the interrupt instruction, and performing packet analysis on the target information to obtain the first analysis result.

In an embodiment, the target memory has a capacity greater than or equal to the receiving-length, and the target memory may be a memory of the receiving device.

In an embodiment, the information frame processing software receives the interrupt instruction sent by the receiving and processing circuit, obtains the target information from the target memory based on the interrupt instruction, and performs packet analysis on the target information to obtain the first analysis result. The target memory is a shared memory of the information frame processing software and the receiving and processing circuit.

In the present application, the receiving and processing circuit provides an interrupt instruction to the information frame processing software after receiving the target information having a length equal to the receiving-length.

In some embodiments, the target information can also be obtained by the following method: the receiving and processing circuit sends received information to the information frame processing software in real time, and stops sending information to the information frame processing software when the received information has a length equal to the receiving-length, so that the information frame processing software obtains the target information.

In some embodiments, the determining that the first analysis result indicates that no downlink data from a sending device is to be sent to the receiving device includes:
  determining whether the traffic indication message included in the first analysis result is a first preset value; and
  determining, in case that the traffic indication message included in the first analysis result is the first preset value, that the first analysis result indicates that no downlink data from the sending device is to be sent to the receiving device.

In an embodiment, the first preset value may be 0 or 1.

In an embodiment, in case that the traffic indication message included in the first analysis result is a second preset value, the receiving device determines that downlink data is to be sent from a sending device, and receives the downlink data after remaining information in the beacon frame except the target information is received.

In an embodiment, the second preset value may also be 0 or 1. The first preset value is different from the second preset value. For example, when the first preset value is 0, the second preset value may be 1.

In an embodiment, for example, in the embodiment of FIG. 1, if the target information received from the third second is analyzed, and the obtained first analysis result indicates that downlink data is to be sent from a sending device, the receiving device starts to receive the downlink data after receiving remaining information. After receiving all the downlink data, at the ninth second, the information frame is received again based on the receiving-length.

Figure 3:
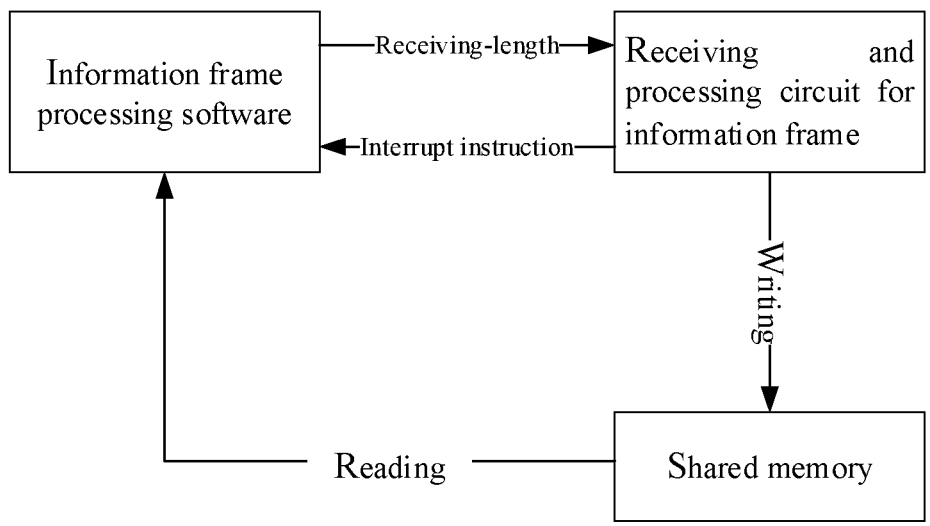
FIG. 3 is a diagram showing an internal processing structure of a receiving device according to the present application.

FIG. 3 is a diagram showing an internal processing structure of a receiving device according to the present application. As shown in FIG. 3, the structure includes: an information frame processing software, a receiving and processing circuit for information frame and a shared memory (namely target memory).

The information frame processing software is used to configure a receiving-length of the receiving and processing circuit; reading target information from the shared memory after receiving the interrupt instruction sent by the receiving and processing circuit; performing packet analysis on the target information to obtain a first analysis result; and controlling, in case of determining that the first analysis result indicates that no downlink data from a sending device is to be sent to the receiving device, the receiving device to enter a sleep state.

The receiving and processing circuit is used to receive the receiving-length configured by the information frame processing software; writing the received information into the shared memory; and sending the interrupt instruction to the information frame processing software when the length of the received information is equal to the receiving-length (that is, the target information is received).

The apparatus for receiving information provided in this application is described below, and the apparatus for receiving information described below and the method for receiving information described above can be referred to in correspondence.

Figure 4:
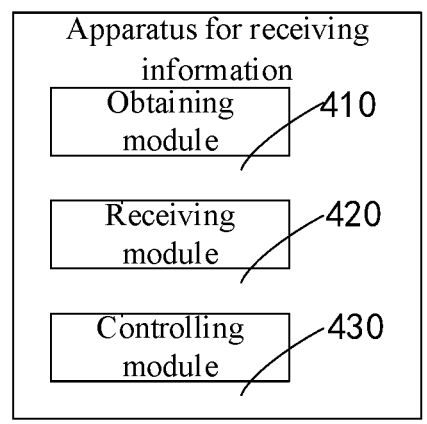
FIG. 4 is a structural diagram of an apparatus for receiving information according to the present application.

FIG. 4 is a structural diagram of an apparatus for receiving information according to the present application. As shown in FIG. 4, the apparatus for receiving information includes:

an obtaining module 410, used to obtain a receiving-length;

a receiving module 420, used to receive a beacon frame sent by a sending device based on the receiving-length to obtain target information, where the receiving-length is less than the total length of the beacon frame; and a controlling module 430, used to perform packet analysis on the target information to obtain a first analysis result, and further used to control, in case of determining that the first analysis result indicates that no downlink data from a sending device is to be sent to the receiving device, the receiving device to enter a sleep state.

According to the apparatus for receiving information of the present application, the receiving module 420 is used to:

send the receiving-length to a receiving and processing circuit for information frame to control the receiving and processing circuit to receive the beacon frame according to the receiving-length to obtain the target information.

According to the apparatus for receiving information of the present application, the obtaining module 410 is used to:

receive a target beacon frame sent by the sending device;

analyze the target beacon frame to obtain a second analysis result, where the second analysis result includes traffic indication message;

determine a byte index of the traffic indication message in the second analysis result; and determine the byte index as the receiving-length.

According to the apparatus for receiving information of the present application, the target information is stored in the target memory, and the controlling module 430 is used to:

receive an interrupt instruction sent by the receiving and processing circuit; and obtain the target information from the target memory based on the interrupt instruction, and perform packet analysis on the target information to obtain the first analysis result.

According to the apparatus for receiving information of the present application, the controlling module 430 is used to:

determine whether the traffic indication message included in the first analysis result is a first preset value; and determine, in case that the traffic indication message included in the first analysis result is the first preset value, that the first analysis result indicates that no downlink data from the sending device is to be sent to the receiving device.

According to the apparatus for receiving information of the present application, the controlling module 430 is further used to determine, in case that the traffic indication message included in the first analysis result is a second preset value, that the first analysis result indicates that downlink data is to be sent from a sending device; and the receiving module is further used to receive the downlink data after remaining information in the beacon frame except the target information is received.

Figure 5:
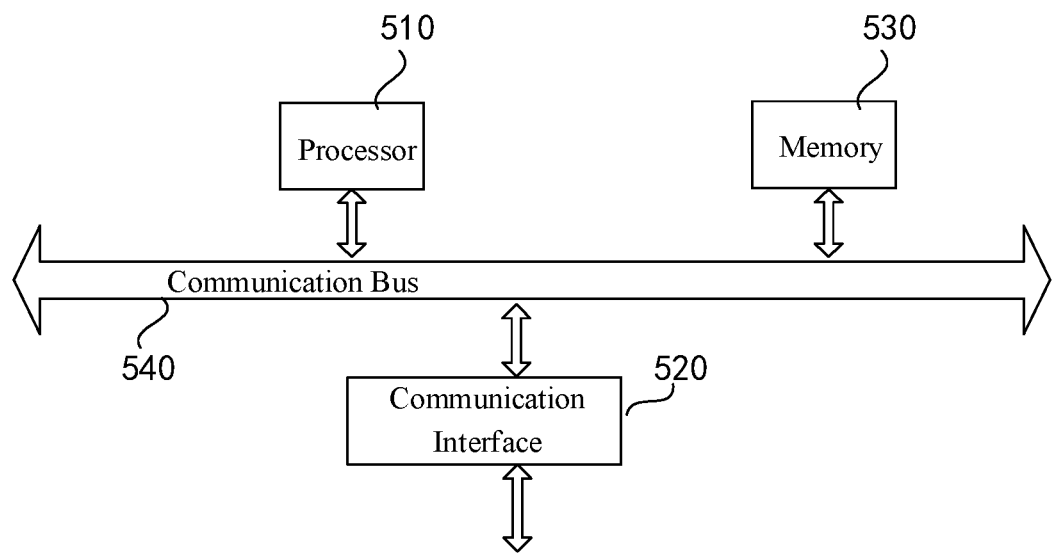
FIG. 5 is a diagram showing an entity structure of a receiving device according to the present application.

FIG. 5 is a diagram showing an entity structure of a receiving device according to the present application. As shown in FIG. 5, the receiving device may include: a processor 510, a communication interface 520, a memory 530, and a communication bus 540. The processor 510, the communication interface 520, and the memory 530 communicate with each other through the communication bus 540. The processor 510 may invoke logic instructions in the memory 530 to perform the steps of a method for receiving information, including: obtaining a receiving-length; receiving a beacon frame sent by a sending device based on the receiving-length to obtain target information, where the receiving-length is less than the total length of the beacon frame; performing packet analysis on the target information to obtain a first analysis result; and controlling, in case of determining that the first analysis result indicates that no downlink data from a sending device is to be sent to the receiving device, the receiving device to enter a sleep state.

In addition, the above logic instructions in the memory 530 can be realized in the form of software function units and be stored in a computer-readable storage medium when sold or used as an individual product. The solutions of the present application in essential or the part of the solutions that contributes to the related art or the part of the solutions can be embodied in the form of a software product, and the computer software product is stored in a storage medium, including several instructions, which are used to make a computer device (which can be a personal computer, a server, or a network device and the like) execute all or part of the steps of the methods described in the various embodiments of the present application. The aforementioned storage media include: USB flash disk, mobile hard disk, read-only memory (ROM), random access memory (RAM), magnetic disk or optical disk, and other media that can store program codes.

The present application further provides a computer program product, the computer program product includes a computer program stored on a non-transitory computer-readable storage medium, where the computer program, when executed by the processor, causes the processor to perform steps of the above-mentioned method for receiving information. The method includes: obtaining a receiving-length; receiving a beacon frame sent by a sending device based on the receiving-length to obtain target information, where the receiving-length is less than the total length of the beacon frame; performing packet analysis on the target information to obtain a first analysis result; and controlling, in case of determining that the first analysis result indicates that no downlink data from a sending device is to be sent to the receiving device, the receiving device to enter a sleep state.

The present application further provides a non-transitory computer-readable storage medium having a computer program stored thereon, where the computer program, when executed by a processor, causes the processor to perform steps of the above-mentioned method for receiving information. The method includes: obtaining a receiving-length; receiving a beacon frame sent by a sending device based on the receiving-length to obtain target information, where the receiving-length is less than the total length of the beacon frame; performing packet analysis on the target information to obtain a first analysis result; and controlling, in case of determining that the first analysis result indicates that no downlink data from a sending device is to be sent to the receiving device, the receiving device to enter a sleep state.

The device embodiments described above are merely illustrative, the units described as separate components may or may not be physically separate, and the components displayed as units may or may not be physical units, that is, may be located at the same place or be distributed to multiple network units. Some or all of the modules may be selected according to actual needs to achieve the purpose of the solution of the present embodiment. Those of ordinary skill in the art can understand and implement the solution described above without paying creative works.

Through the description of the embodiments above, those skilled in the art can clearly understand that the various embodiments can be implemented by means of software and a necessary general hardware platform, or by hardware. Based on such understanding, the above solutions of the present application in essence or a part of the solutions that contributes to the related art can be embodied in the form of a software product, which can be stored in a storage medium such as ROM/RAM, magnetic disk, compact disk and the like, and includes several instructions to cause a computer device (which can be a personal computer, server, network device and the like) to perform the methods described in various embodiments or a part thereof.

Finally, it should be noted that the above embodiments are only used to explain the solutions of the present application, and are not to limited them. Although the present application has been described in detail with reference to the foregoing embodiments, it should be understood by those skilled in the art that they can still modify the solutions documented in the foregoing embodiments and make equivalent substitutions to a part of the features; these modifications and substitutions do not make the essence of the corresponding solutions depart from the scope of the solutions of various embodiments of the present application.

What is claimed is:

1. A method for receiving information, being applied to a receiving device, and comprising:
   obtaining a receiving-length;
   receiving a beacon frame sent by a sending device based on the receiving-length to obtain target information, wherein the receiving-length is less than a total length of the beacon frame;
   performing packet analysis on the target information to obtain a first analysis result, the first analysis result including a traffic indication message; and
   if the first analysis result indicates that no downlink data from the sending device is to be sent to the receiving device, controlling the receiving device to enter a sleep state;
   wherein obtaining the receiving-length comprises:
      receiving a target beacon frame sent by the sending device;
      analyzing the target beacon frame to obtain a second analysis result;
      dividing the second analysis result into multiple bytes and configuring a byte index for each byte of the multiple bytes;
      for each byte, determining whether the byte contains the traffic indication message; and
      if the byte contains the traffic indication message, determining a value of the byte index of the byte as the receiving-length.

2. The method of claim 1, wherein receiving a beacon frame sent by a sending device based on the receiving-length to obtain target information comprises:
   sending the receiving-length to an information frame receiving and processing circuit to control the information frame receiving and processing circuit to receive the beacon frame according to the receiving-length to obtain the target information.

3. The method of claim 2, wherein the target information is stored in a target memory, and performing packet analysis on the target information to obtain a first analysis result comprises:
   receiving an interrupt instruction sent by the information frame receiving and processing circuit; and
   obtaining the target information from the target memory based on the interrupt instruction, and performing packet analysis on the target information to obtain the first analysis result.

4. The method of claim 2, wherein determining that the first analysis result indicates that no downlink data from a sending device is to be sent to the receiving device comprises:
   determining whether the traffic indication message included in the first analysis result is a first preset value; and
   determining, in case that the value of the traffic indication message included in the first analysis result is the first preset value, that the first analysis result indicates that no downlink data from the sending device is to be sent to the receiving device.

5. The method of claim 4, further comprising:
   determining, if the value of the traffic indication message included in the first analysis result is a second preset value, that the first analysis result indicates that downlink data is to be sent from a sending device, and receiving the downlink data after remaining information in the beacon frame except the target information is received, wherein the first preset value is different from the second preset value.

6. The method of claim 1, wherein the target information is stored in a target memory, and performing packet analysis on the target information to obtain a first analysis result comprises:
   receiving an interrupt instruction sent by an information frame receiving and processing circuit; and
   obtaining the target information from the target memory based on the interrupt instruction, and performing packet analysis on the target information to obtain the first analysis result.

7. The method of claim 6, wherein determining that the first analysis result indicates that no downlink data from a sending device is to be sent to the receiving device comprises:
  determining whether a value of the traffic indication message included in the first analysis result is a first preset value; and
  determining, in case that the value of the traffic indication message included in the first analysis result is the first preset value, that the first analysis result indicates that no downlink data from the sending device is to be sent to the receiving device.

8. The method of claim 7, further comprising:
  determining, if the value of the traffic indication message included in the first analysis result is a second preset value, that the first analysis result indicates that downlink data is to be sent from a sending device, and receiving the downlink data after remaining information in the beacon frame except the target information is received, wherein the first preset value is different from the second preset value.

9. A receiving device, comprising a processor and a memory having a computer program stored thereon executable by the processor, wherein the computer program, when executed by the processor, causes the processor to perform the following operations:
  obtaining a receiving-length;
  receiving a beacon frame sent by a sending device based on the receiving-length to obtain target information, wherein the receiving-length is less than a total length of the beacon frame;
  performing packet analysis on the target information to obtain a first analysis result; and
  controlling, in case of determining that the first analysis result indicates that no downlink data from the sending device is to be sent to the receiving device, the receiving device to enter a sleep state;
  wherein obtaining a receiving-length comprises:
  receiving a target beacon frame sent by the sending device;
  analyzing the target beacon frame to obtain a second analysis result;
  dividing the second analysis result into multiple bytes and configuring a byte index for each byte of the multiple bytes;
  for each byte, determining whether the byte contains the traffic indication message; and
  if the byte contains the traffic indication message, determining a value of the byte index as the receiving-length.

10. The receiving device of claim 9, wherein the receiving a beacon frame sent by the sending device based on the receiving-length to obtain target information comprises:
  sending the receiving-length to an information frame receiving and processing circuit to control the information frame receiving and processing circuit to receive the beacon frame according to the receiving-length to obtain the target information.

11. The receiving device of claim 10, wherein the target information is stored in a target memory, and the performing packet analysis on the target information to obtain a first analysis result comprises:
  receiving an interrupt instruction sent by the information frame receiving and processing circuit; and
  obtaining the target information from the target memory based on the interrupt instruction, and performing packet analysis on the target information to obtain the first analysis result.

12. The receiving device of claim 9, wherein the target information is stored in a target memory, and performing packet analysis on the target information to obtain a first analysis result comprises:
  receiving an interrupt instruction sent by an information frame receiving and processing circuit; and
  obtaining the target information from the target memory based on the interrupt instruction, and performing packet analysis on the target information to obtain the first analysis result.

13. A non-transitory computer-readable storage medium having a computer program stored thereon that, when executed by a processor, causes the processor to perform a method for receiving information, being applied to a receiving device, and comprising:
  obtaining a receiving-length;
  receiving a beacon frame sent by a sending device based on the receiving-length to obtain target information, wherein the receiving-length is less than a total length of the beacon frame;
  performing packet analysis on the target information to obtain a first analysis result, the first analysis result including a traffic indication message; and
  if the first analysis result indicates that no downlink data from a sending device is to be sent to the receiving device, controlling the receiving device to enter a sleep state;
  wherein obtaining the receiving-length comprises:
  receiving a target beacon frame sent by the sending device;
  analyzing the target beacon frame to obtain a second analysis result:
  dividing the second analysis result into multiple bytes and configuring a byte index for each byte of the multiple bytes;
  for each byte, determining whether the byte contains the traffic indication message; and
  if the byte contains the traffic indication message, determining a value of the byte index as the receiving-length.

* * * * *